Dec. 27, 1927.  
G. W. OSBORN  
1,653,966  
SINGLE WALL REENFORCED HIGH PRESSURE FLOAT  
Filed May 17, 1926
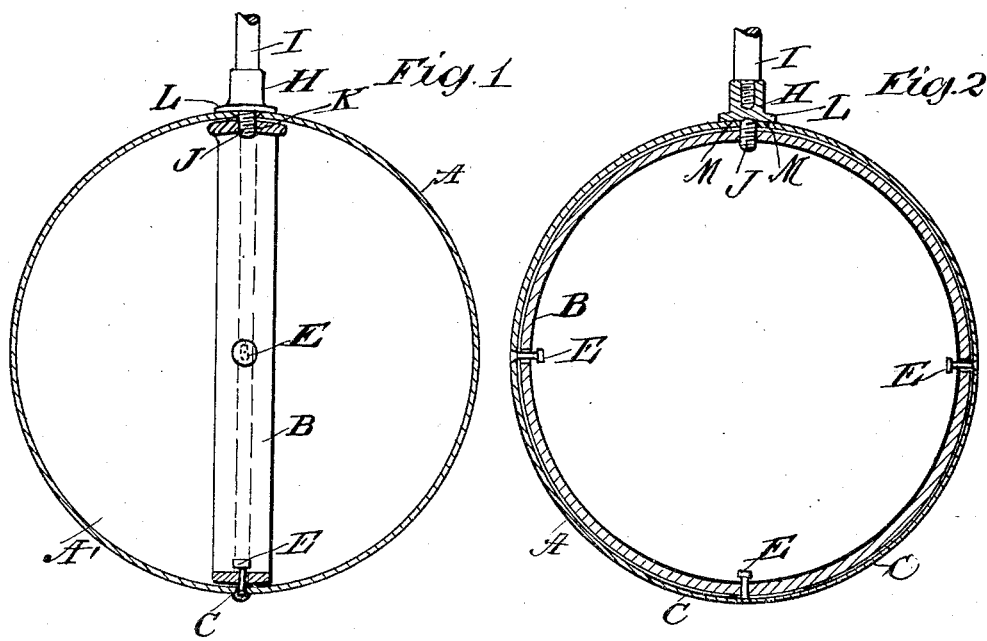
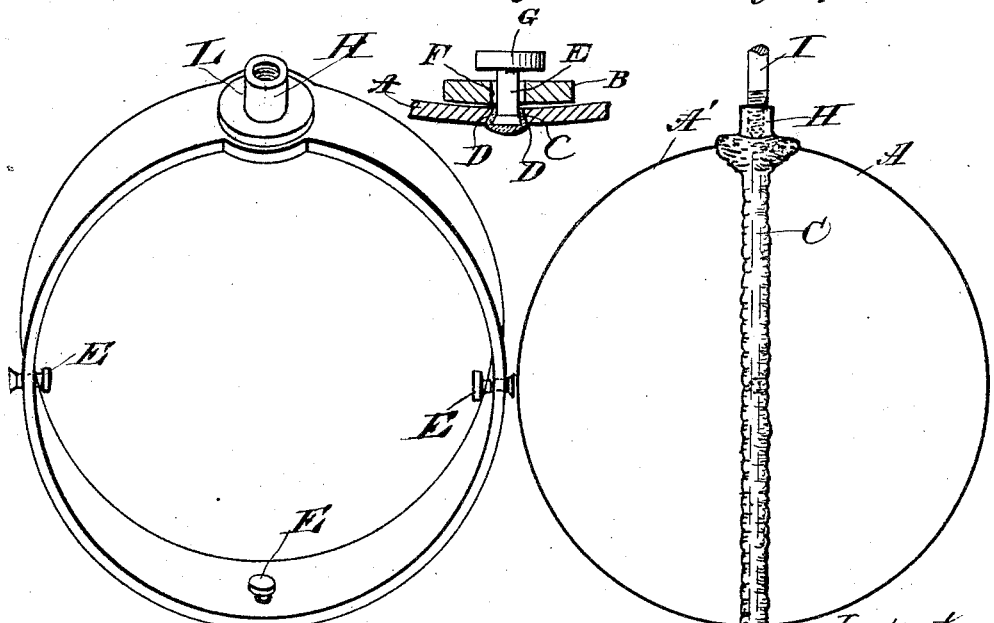

Patented Dec. 27, 1927.

1,653,966

UNITED STATES PATENT OFFICE.

GEORGE W. OSBORN, OF CLEVELAND, OHIO.

SINGLE-WALL REENFORCED HIGH-PRESSURE FLOAT.

Application filed May 17, 1926. Serial No. 109,640.

The objects of the invention are to provide an improved float which is especially adapted for use under very high pressures or under super high temperatures, as in hot oils, caustic soda, acids and so forth, or wherever the use of a high pressure float is required. These floats can not be constructed of thin metal that can be spun into shape unless they are to withstand very low pressures. Also this type of float may be constructed of any metal that can be brazed or welded, especially such as steel or its alloys, Monel metal or acid proof metal of any sort, or of any sheet metal having extreme tensile strength, of such a character that it would be impossible to produce floats therefrom in the ordinary way by spinning.

To make such construction possible the globular bodies of the floats are diametrically divided into equal portions, and are made of one thickness only, thus greatly simplifying the construction.

The joint or seam between the portions of the body is reenforced by means of a metal ring formed of heavier material than the body of the float and the welded seam is reenforced thereby, and the ring is directly connected with the supporting rod, to the outer end of which the float is attached, whereby the weight of the load is carried upon the ring, thus relieving the float from strain and preventing it from breaking away from the rod.

The thickness of the ring may vary according to the amount of strength required for each float. This internal ring is provided with spaced apart pins projecting radially therefrom into the joint between the float portions, and when the joint is filled with welding material the pins are welded to the body of the float, but not to the ring. The ring may not engage the body of the float closely but is subject to independent expansion and contraction without affecting the body of the float. The ring is directly connected with the supporting rod by means of a screw threaded supporting member that passes through the joint between the edges of the portions, is provided with an external flange that overlaps the adjacent edges of the body portions or shell of the float and binds them over the outer side of the ring.

When all these members are assembled together in their places, the seam between the edges of the body portions is filled with welding metal in which the pins are embedded. The welding metal is preferably composed of the same material as that of the body of the float but the edges thereof may be brazed or soldered together if desired.

The pins or studs may be provided with retaining heads and will permit the ring to expand or contract independently of the body and the body will be supported by the ring, thus increasing the durability of the device.

The invention is exemplified in the accompanying drawings hereinafter more fully described and specifically pointed out in the claims. In the accompanying drawings Fig. 1 is a vertical central section of the device;

Fig. 2 is a similar section taken at right angles to Fig. 1;

Fig. 3 is a perspective of the reenforcing ring;

Fig. 4 is a side elevation of the device;

Fig. 5 is an enlarged horizontal section of the joint, showing the weld and the reenforcing ring and one of the pins embedded in the weld.

In these views, A, A', are the semi-spherical divisions of the shell of the hollow float;

B is the internal reenforcing ring;

C is the welded seam which fills the joint between the inclined sides D, D of the meeting edges of the shell;

E, E are the connecting pins between the ring and welded joint, spaced apart in openings F, F in the ring, and preferably provided with heads G, G.

These pins support the body loosely upon the ring and are not welded to the ring.

H is the connecting member between the ring and the supporting rod I and this connection is constructed with a screw threaded inner end J which is passed through the screw threaded opening K in the ring and is also provided with a lateral flange L which is tightly clamped upon the adjoining or opposed edges M of the shell, thus binding the parts tightly together.

It will be observed that the line of division of the float sections and the line of weld runs substantially in the same plane as that of the supporting rod I and connection H.

This method of construction differs from the ordinary method of construction in which the float is divided at right angles to the plane of the supporting rod and its connection with the float, thus making the point of connection with the float at the center of one of the sections.

In this former method when the connection is welded to the center of one section the heat has a tendency to anneal that section at the point of connection, thereby weakening the body of the float at this point.

But with this method in which the support and connection are attached in the line of weld no such injury is produced upon the crown of either section and any effect of annealing produced at the rims by welding would not extend beyond the area of surface protected by the internal reenforcing ring.

The importance of the loose connection of the reenforcing ring with the body of the float is obvious, since the walls of the float, being thinner than the wall of the ring, have ratios of expansion and contraction that are quite different when affected by heat, and if they were welded together they would crack apart at the line of the weld and loosen or crack the weld in the body. This manner of support, however, permits them to expand and contract independently of each other.

Having described the invention, what I claim as new and desire to secure by Letters Patent is:

1. In a float, the combination with a hollow body divided into two sections, the edges of which are integrally attached together, an internal reenforcing ring loosely attached to said body, a support, a connection between said support and float, said connection passing through the joint between said float sections, said connection serving also as means for binding said sections of the float and said ring together.

2. A high pressure float comprising a hollow sphere divided into equal sections welded together at their opposed edges, a separate internal ring, pins secured in the welded joint between said sections, said pins, also engaged with said internal ring, a support for said float, and a connector passing through said welded joint and secured at one end to said support and at the other end to said ring.

3. A high pressure float comprising a hollow sphere divided into equal sections welded together at their opposed edges, a separate internal ring, pins secured in the welded joint between said sections, said pins, also engaged with said internal ring, a support for said float, and a connector passing through said welded joint and secured at one end to said support and at the other end to said ring, said connector being provided with an annular flange between which and said ring the opposed edges of said sections are clamped.

4. In a device of the character described, a hollow float body diametrically separated into equal sections, an internal ring, spaced apart pins engaged loosely with said ring and extended radially therefrom into the joint between said sections, a support for the float and adjustable connecting means between said ring and support and means for connecting said float sections together.

5. In a device of the character described, a hollow float body diametrically separated into equal sections, an internal ring, spaced apart pins engaged loosely with said ring and extended radially therefrom into the joint between said sections, a support for the float and adjustable connecting means between said ring and support, the sections of said body being integrally attached together.

6. In a device of the character described, a hollow float body diametrically separated into equal sections, means for integrally connecting the same together, an internal supporting and reenforcing member therefor, said flot body and reenforcing member being loosely connected together, and an exterior support adjustably connected with said internal supporting and reenforcing member.

7. In a device of the character described in combination, a hollow spherical body, an internal reenforcing ring therefor, a common external support for said ring and body, said support passing through said body and adjustably connected to said ring, said body being divided into two sections upon a diametrical plane coinciding with the plane of said support, the opposed edges of said sections being welded together, the width of said reenforcing ring being coextensive with the area affected by the heat of welding said sections together.

8. In a device of the character described in combination, a hollow spherical body, an internal reenforcing ring therefor, a common external support for said ring and body, said support passing through said body and adjustably connected to said ring, said body being divided into two sections upon a diametrical plane coinciding with the plane of said support, the opposed edges of said sections being welded together, the width of said reenforcing ring being coextensive with the area affected by the heat of welding said sections together, and spaced apart means secured within the welded joint of said sections for loosely supporting said body upon said ring.

9. In a single wall high pressure float, a spherical body composed of hemispherical sections integrally secured together, an independent reenforcing ring loosely secured therein over the line of union of said sections, and an external support for said ring and connecting means between said support and ring, said line of union being substantially in the plane of said support and connecting means.

In testimony whereof I hereunto affix my signature.

GEORGE W. OSBORN.